United States Patent Office 2,835,670
Patented May 20, 1958

2,835,670
AMINOAZOLEDISULFIDES

Albert F. Hardman, Northampton Township, Summit County, Ohio, assignor to The Goodyear Tire & Rubber Company, Akron, Ohio, a corporation of Ohio No Drawing. Application September 23, 1954
Serial No. 458,028

9 Claims. (Cl. 260—247.1)

This invention relates to aminoazole disulfides and to a method of making these materials.

Aminoazole disulfides are powerful accelerators of vulcanization of rubber. They can be used to promote the curing of rubber with or without sulfur. These materials are particularly useful in black tread stocks and other compositions containing rubber in which a powerful, yet delayed action, non-scorching accelerator is needed to promote the curing of the rubber composition.

The compounds with which this invention is particularly concerned are secondary aminoazole disulfides which can be represented by the general structural formula

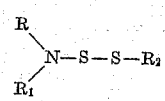

in which R and $R_1$ are the same or different aliphatic, cycloaliphatic, or aralkyl groups or R and $R_1$ together form a single chain and $R_2$ represents a member of the class consisting of thiazoles, oxazoles and imidazoles.

According to the invention, the aminoazole disulfides are prepared by reacting an amine monosulfide or an amine disulfide with a 2-mercapto azole.

When using an amine monosulfide, the reaction appears to proceed according to the following equation, in which morpholine monosulfide and 2-mercapto benzothiazole are used as representative starting materials.

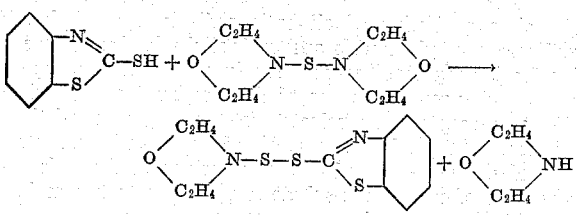

By using another mol of the mercapto azole, the free amine produced can be converted into the amine salt of the mercapto azole which is also an accelerator of vulcanization.

When using an amine disulfide, the reaction appears to proceed according to the following equation, using representative starting materials similar to those shown above.

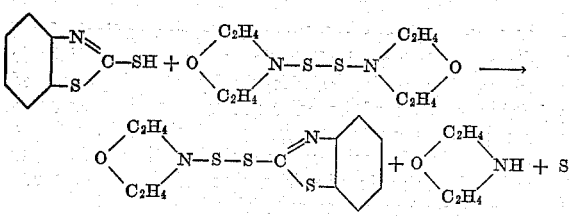

Again, the free amine can be converted into the amine salt by using another mol of the mercapto azole.

The practice of the invention is illustrated by the following representative examples.

EXAMPLE 1

*Preparation of 2-(4-morpholinyldithio) benzothiazole*

Twenty and five-tenths grams of morpholine monosulfide were dissolved in 100 millimeters of ethanol by warming and stirring the mixture, 17 grams of 2-mercaptobenzothiazole were dissolved in 100 millimeters of ethanol, and the two solutions were mixed. Crystals soon began to separate. The mixture was stirred at room temperature for 4 to 5 hours. It was then cooled and filtered. The product was washed with ethanol and dried. A yield of 26 grams of product melting at 134 to 135° C. was obtained.

EXAMPLE 2

*Preparation of 2-(4-morpholinyldithio) benzothiazole*

Twenty-four and nine-tenths grams of morpholine disulfide were dissolved in 100 milliliters of ethanol by warming and stirring the mixture. Seventeen grams of 2-mercaptobenzothiazole were added and the mixture was warmed to dissolve the materials then filtered and allowed to stand one hour at room temperature. It was then cooled and the crystallized product was filtered from the solution and washed with alcohol. The material was recrystallized from benzene and dried. The product had a melting point of 135° C. It was analyzed for nitrogen and sulfur, and contained 9.90% nitrogen and 34.0% sulfur. The calculated values for 2-(4-morpholinyldithio)benzothiazole are 9.88% nitrogen and 33.8% sulfur.

The examples above illustrate the invention with particular respect to the reaction of one mole of the amine monosulfide or disulfide with one mole of mercapto azole. However, as previously described, two mols of the mercapto azole can be used, if desired, in which case the product obtained will be a mixture of the amino azole disulfide and the amine salt of the mercapto azole. Inasmuch as amine salts of mercapto azoles are also very effective accelerators of vulcanization of rubber, the production of this mixture uses up all of the reactants to form accelerators and thus eliminates the necessity of recovering materials which economical operation requires when the reactants are used in the ratio of one mole to one mole.

Various other amino azole disulfides can be prepared by using other amine monosulfides or disulfides and other mercapto azoles in place of those shown in Examples 1 and 2. Thus, 2-(di-methylaminodithio)benzothiazole is prepared by reacting N,N'-thio-bis-dimethyl amine with 2 - mercaptobenzothiazole; 2-(di - n - propylaminodithio) benzothiazole is prepared by reacting N,N'-dithio-bis-di-n-propyl amine with 2-mercaptobenzothiazole.

The amine sulfides can be represented by the structural formula

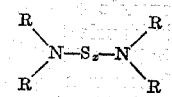

in which the R's are the same or different aliphatic, cycloaliphatic, or aralkyl radicals or in which the two R's on one or both nitrogen atoms are joined to form a single ring, and $x$ represents one of the integers 1 and 2. Thus, included are amine sulfides in which the two R's on a nitrogen atom are a closed chain, which can be interrupted by sulfur, oxygen or an imino group (=NH).

Representative amine monosulfides and amine disulfides are N,N'-thio-bis-di-secondary amines and N,N' dithio-bis-disecondary amines, such as N,N'-thio-bis-dimethylamine
N,N'-thio-bis-diethylamine
N,N'-thio-bis-di-n-propylamine
N,N'-thio-bis-di-n-butylamine
N,N'-thio-bis-di-isobutylamine
N,N'-thio-bis-di-n-amylamine
N,N'-thio-bis-di-isoamylamine
N,N'-thio-bis-di-n-hexylamine
N,N'-thio-bis-di-n-heptylamine
N,N'-thio-bis-di-n-octylamine
N,N'-thio-bis-di-benzylamine
N,N'-thio-bis-methyl cyclohexylamine
N,N'-thio-bis-ethyl cyclohexylamine
N,N'-thio-bis-morpholine
N,N'-thio-bis-(thiomorpholine)
N,N'-thio-bis-(4-N-ethyl piperazine)
N,N'-thio-bis-piperidine
N,N'-thio-bis-pyrrolidine
N,N'-dithio-bis-dimethylamine
N,N'-dithio-bis-diethylamine
N,N'-dithio-bis-di-n-propylamine
N,N'-dithio-bis-di-n-butylamine
N,N'-dithio-bis-di-isobutylamine
N,N'-dithio-bis-di-n-amylamine
N,N'-dithio-bis-di-isoamylamine
N,N'-dithio-bis-di-n-hexylamine
N,N'-dithio-bis-di-n-heptylamine
N,N'-dithio-bis-di-n-octylamine
N,N'-dithio-bis-di-benzylamine
N,N'-dithio-bis-methyl cyclohexylamine
N,N'-dithio-bis-ethyl cyclohexylamine
N,N'-dithio-bis-morpholine
N,N'-dithio-bis-(thiomorpholine)
N,N'-dithio-bis-(4-N-ethyl piperazine)
N,N'-dithio-bis-piperidine
N,N'-dithio-bis-pyrrolidine Saturated straight chain amine monosulfides, saturated straight chain amine disulfides, N,N'-thio-bis-morpholine and N,N'-dithio-bis-morpholine constitute preferred species.

The mercapto azoles which can be used include the mercaptothiazoles, mercaptoimidazoles and the mercaptooxazoles. Either aliphatic or aromatic azoles can be used. Representative examples are 2-mercaptothiazole
2-mercaptooxazole
2-mercaptoimidazole
2-mercapto-4-methylthiazole
2-mercapto-4-methyloxazole
2-mercapto-4-methylimidazole
2-mercapto-4-ethylthiazole
2-mercapto-4-methyloxazole
2-mercapto-4-methylimidazole
2-mercapto-4-n-propylthiazole
2-mercapto-4-n-propyloxazole
2-mercapto-4-n-propylimidazole
2-mercapto-4-n-butylthiazole
2-mercapto-4-n-butyloxazole
2-mercapto-4-n-butylimidazole
2-mercapto-4,5-dimethylthiazole
2-mercapto-4,5-dimethyloxazole
2-mercapto-4,5-dimethylimidazole
2-mercapto-4,5-diethylthiazole
2-mercapto-4,5-diethyloxazole
2-mercapto-4,5-diethylimidazole
2-mercapto-4,5-di-n-propylthiazole
2-mercapto-4,5-di-n-propyloxazole
2-mercapto-4,5-di-n-propylimidazole
2-mercapto-4,5-di-n-butylthiazole
2-mercapto-4,5-di-n-butyloxazole 2-mercapto-4,5-di-n-butylimidazole
4-phenyl-2-mercaptothiazole
4-phenyl-2-mercaptooxazole
4-phenyl-2-mercaptoimidazole
4-phenyl-5-methyl-2-mercaptothiazole
4-phenyl-5-methyl-2-mercaptooxazole
4-phenyl-5-methyl-2-mercaptoimidazole
2-mercaptobenzothiazole
4-phenyl-2-mercaptobenzothiazole
6-phenyl-2-mercaptobenzothiazole
2-mercapto-tetrahydrobenzothiazole
2-mercapto-naphthothiazole The 2-mercaptoarylenethiazoles and particularly 2-mercaptobenzothiazole constitute preferred species.

In preparing these materials solvents may be present, and it is generally preferable to use an amine catalyst to speed up the reactions. Solvents which have been found to be suitable for use in this process are the lower aliphatic alcohols such as methanol, ethanol, isopropanol, normal propanol, normal butanol and other solvents such as benzene, toluene, and xylene. While various amines can be used as catalysts, it is usually most convenient to employ the amine corresponding to the amine radical of the amine sulfide used in the reaction.

The reactions of the examples were carried out at room temperature, or in warm alcohol. Higher or lower temperatures can be used. The temperature is not critical, but it is desirable to use a temperature that will give reasonably fast reaction rates so that the process may be economically carried out.

While certain representative embodiments and details have been shown for the purpose of illustrating the invention, it will be apparent to those skilled in this art that various changes and modifications may be made therein without departing from the spirit or scope of the invention.

I claim:

1. The method of preparing an amino azole disulfide which comprises reacting (a) an amine sulfide from the class consisting of amine monosulfides and amine disulfides of the general formula:

in which the nitrogen substituent, R's, are selected from the class consisting of aliphatic radicals, cycloaliphatic radicals, aralkyl radicals and cycloaliphatic rings formed by the joining together of the pair of R's on a nitrogen atom and $x$ represents one of the integers 1 and 2, with (b) a mercapto azole selected from the class consisting of mercaptothiazoles, mercaptoimidazoles, and mercaptooxazoles, said amine sulfide being reacted in the ratio of one mole of said amine sulfide to from one to two moles of said mercaptoazole.

2. The method of preparing an aminothiazole disulfide which comprises reacting (a) an amine sulfide from the class consisting of amine monosulfides and amine disulfides of the general formula

in which the nitrogen subtituents, R's, are radicals from the class consisting of aliphatic radicals, cycloaliphatic radicals, aralkyl radicals and cycloaliphatic rings formed by joining together of the pairs of R's on a nitrogen atom and $x$ represents one of the integers 1 and 2 with (b) a 2-mercaptothiazole, said amine sulfide being reacted in the ratio of one mole of said amine sulfide to from one to two moles of said mercaptothiazole.

3. The method of preparing an aminobenzothiazole disulfide which comprises reacting (a) an amine sulfide from the class consisting of amine monosulfides and amine disulfides of the general formula

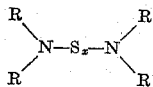

in which the R's are selected from the class consisting of aliphatic radicals, cycloaliphatic radicals, aralkyl radicals and cycloaliphatic rings formed by the joining together of the pair of R's on a nitrogen atom and $x$ represents one of the integers 1 and 2 with (b) a 2-mercaptobenzothiazole, said amine sulfide being reacted in the ratio of one mole of said amine sulfide to from one to two moles of said mercaptobenzothiazole.

4. The method of preparing an aminobenzothiazole disulfide which comprises reacting in a solvent (a) an amine sulfide from the class consisting of amine monosulfides and amine disulfides of the general formula

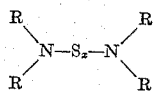

in which the R's are selected from the class consisting of aliphatic radicals, cycloaliphatic radicals, aralkyl radicals and cycloaliphatic rings formed by the joining together of the pair of R's on a nitrogen atom and $x$ represents one of the integers 1 and 2 with (b) a 2-mercaptobenzothiazole, said amine sulfide being reacted in the ratio of one mole of said amine sulfide to from one to two moles of said mercaptobenzothiazole.

5. The method of preparing a saturated straight chain aminobenzothiazole disulfide which comprises reacting (a) an amine sulfide from the class consisting of amine monosulfides and amine disulfides of the general formula

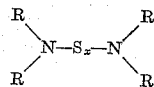

in which the R's are saturated straight chain aliphatic radicals and $x$ represents one of the integers 1 and 2 with (b) 2-mercaptobenzothiazole, said amine sulfide being reacted in the ratio of one mole of said amine sulfide to from one to two moles of said mercaptobenzothiazole.

6. The method of preparing 2-(4-morpholinyldithio) benzothiazole which comprises reacting N,N'-thio-bis-morpholine with 2-mercaptobenzothiazole.

7. The method of preparing 2-(4-morpholinyldithio) benzothiazole which comprises reacting N,N'-dithio-bis-morpholine with 2-mercaptobenzothiazole.

8. The method of preparing 2-(dimethylaminodithio) benzothiazole which comprises reacting N,N-'thio-bis-dimethylamine with 2-mercaptobenzothiazole.

9. The method of preparing 2-(di-n-propyl-amino-dithio) benzothiazole which comprises reacting N,N'-dithio-bis-di-n-propylamine with 2-mercaptobenzothiazole.

References Cited in the file of this patent

UNITED STATES PATENTS 2,273,321    Jones _____ Feb. 17, 1942

FOREIGN PATENTS 711,236    Great Britain _____ June 30, 1954

Notice of Adverse Decision in Interference

In Interference No. 90,521 involving Patent No. 2,835,670, A. F. Hardman, Aminoazoledisulfides, final judgment adverse to the patentee was rendered Apr. 17, 1962, as to claims 1, 2, 3, 4, and 7.

[*Official Gazette June 12, 1962.*]